Figure 1:
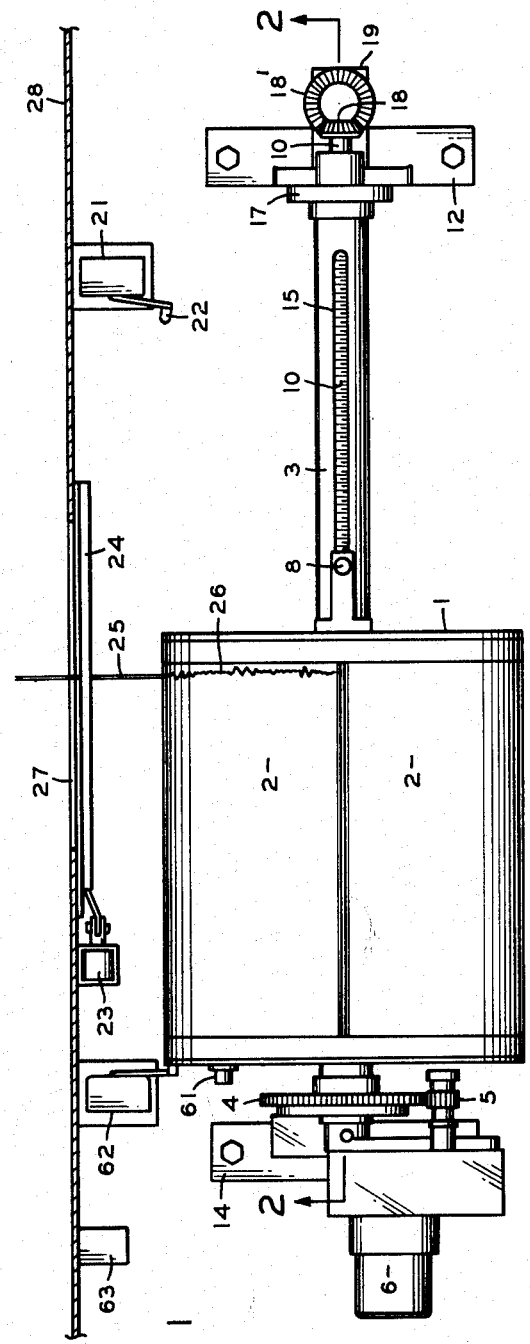

April 28, 1964

R. F. HAUTLY 3,130,931

CHART RECORDER

Filed Jan. 3, 1963

3 Sheets-Sheet 1

INVENTOR
RUDOLPH F. HAUTLY
BY
*Frank Groom Kirtz*

ATTORNEY

April 28, 1964  R. F. HAUTLY  3,130,931
CHART RECORDER

Filed Jan. 3, 1963  3 Sheets-Sheet 2

INVENTOR
RUDOLPH F. HAUTLY
BY *Frank Groom Kirtz*
ATTORNEY

United States Patent Office 3,130,931
Patented Apr. 28, 1964

3,130,931
CHART RECORDER
Rudolph F. Hautly, 630 Kirkwhire, Kirkwood, Mo.
Filed Jan. 3, 1963, Ser. No. 249,274
3 Claims. (Cl. 242—55)

One of the objects of my invention is to provide a chart recorder for specialized use with seismographs. The present art of seismograph chart recorders is limited to the provision of recorders which will record for a twenty-four hour interval. At the end of this time an attendant must go to the recorder and change the recording paper, in order to provide a new surface which can be used for recording for the next twenty-four hour period. For the most sensitive seismographs, photographic paper in relatively large sheets is wrapped around a rotating drum. A shaft of light from a galvanometer mirror is deflected to the photographic paper and thus traces the record of the vibrations detected by the seismograph.

The above procedure is satisfactory in many situations in which the attendant has other duties which can be executed nearby, justifying the expense of his time and labor in changing the sheets. However it has become more and more desirable to locate seismograph stations in remote areas, ordinarily inaccessible.

My chart recorder for seismographs is designed to operate without attention for a period of between thirty and sixty days. Thus an attendant can be flown, by helicopter, to extremely remote inaccessible areas where a seismograph station may be located. The flight expense once a month is justifiable under these conditions since it can be amortized over the monthy period, whereas it would be prohibitive if it occurred every day.

Another object of my invention is to provide a seismograph chart recorder in which the recorder drum translates, while rotating, through an entire cycle once every twenty-four hours automatically. The drum translates in the ordinary sense in exactly twenty-four hours and then is automatically returned to its beginning position in less than a minute.

A further object of my invention is to provide a seismograph chart recorder in which the photographic paper wrapped around the exterior cylindrical surface of the drum is automatically changed during the one minute period occurring when the drum returns to its initial position.

A still further object of my invention is to provide a seismograph chart recorder in which the photographic paper supply is disposed inside the chart drum, together with a take-up roller, so that a pair of storage rollers are provided. One is of fresh photographic paper and the other consists of exposed photographic paper which can be developed at leisure.

An additional object of my invention is to provide a complete, independent unit for a seismographic chart recorder, so that the entire unit can be set up to operate without attention for a month, at the same time automatically repeating daily the cycle of changing paper and operating continuously for the month as if it were constantly attended.

While I have illustrated in the accompanying drawings, a full-scale seismograph chart recorder used in connection with the most sensitive seismographs, I wish to record here my successful invention of the same mechanism adapted for the ordinary seventy millimeter film strip. This is a relatively miniaturized instrument well known in the art. However the mechanism for this instrument is exactly the same, although the proportions are smaller of necessity. The storage and take-up rollers are again placed inside the drum, and the translation and return mechanism is the same as here illustrated.

Figure 2:
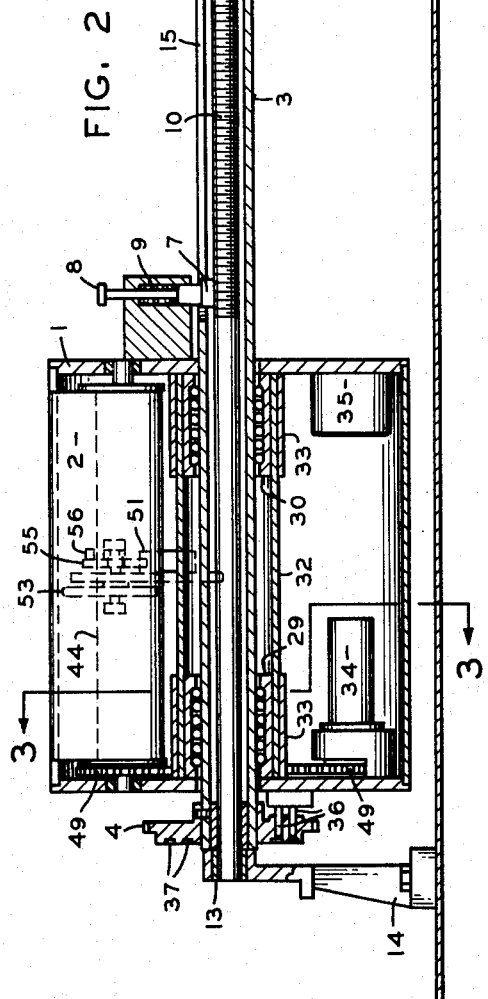
Figure 3:
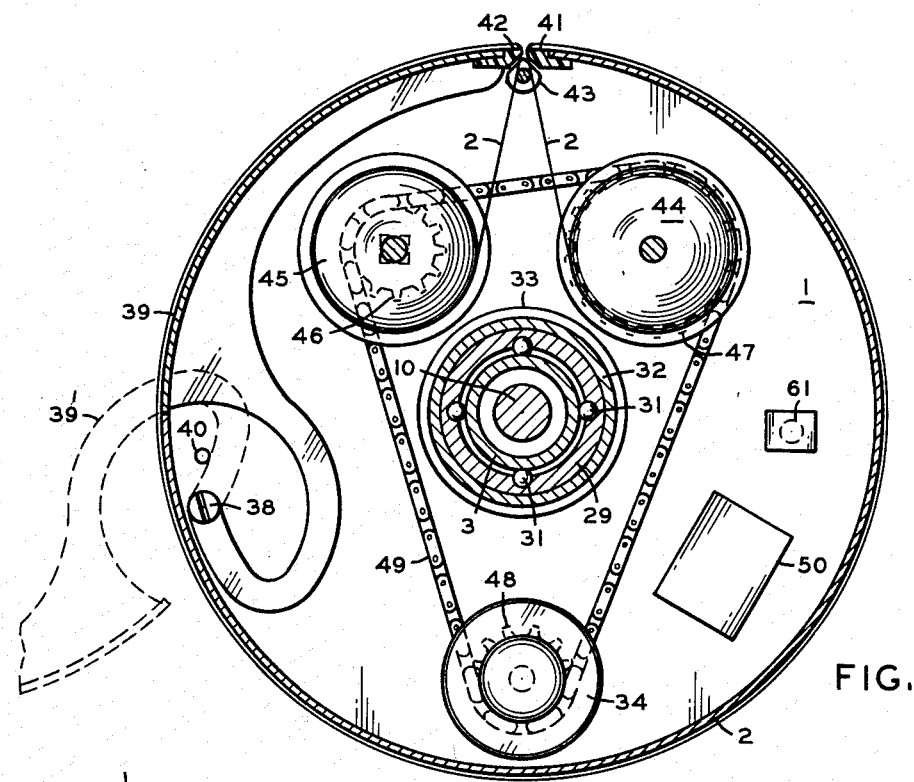
Figure 4:
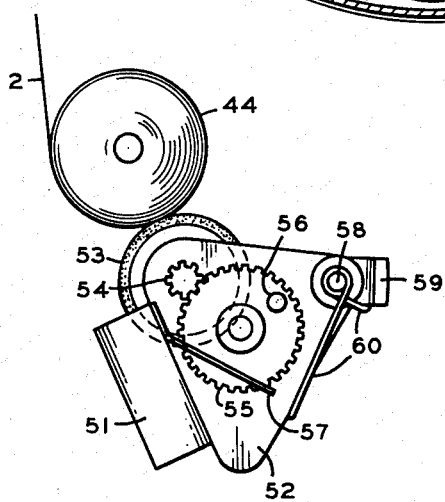
Figure 5:
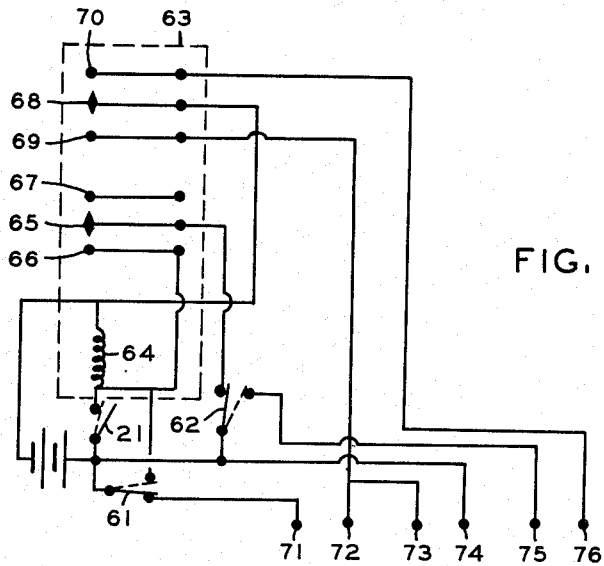
Figure 6:
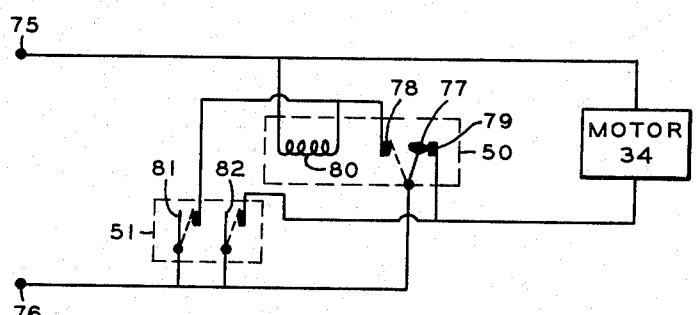

The above and other advantages and objects of my invention will be apparent to those skilled in the art from a study of the accompanying drawings in which, FIG. 1 is a top plan view of the chart recorder;
FIG. 2 is a cross-sectional view taken along the line 2—2 of FIG. 1;
FIG. 3 is a cross-sectional view taken along the line 3—3 of FIG. 2;
FIG. 4 is a detail view of the paper count mechanism located inside the drum;
FIG. 5 is a schematic diagram of the electrical switching circuit; and
FIG. 6 is a schematic diagram of the paper drive motor control circuit.

Referring now to the figures, wherein like numerals denote like parts, numeral 1 is a drum, on which is wrapped a sheet of paper 2. In FIGURE 1 the drum 1 is seen at the left of the hollow shaft 3. The drum is rotatable with and translatable on the hollow shaft 3, so that it can be moved in two senses.

Keyed to the hollow shaft 3 is the gear 4. Gear 4 meshes with the pinion gear 5, driven by the electric motor 6. All of the electrical power for the motor and the other electrical components to be shown is provided by storage batteries which are not shown in the figures. At the right side of the drum 1 and integral therewith is the spring nut 7, provided with a handle 8 and a spring 9. The spring 9 serves to hold the spring nut meshed with the threads of the main screw 10.

At its right end the main screw 10 is disposed rotatably in the shaft bearing 11 on the right post 12. At its left end the shaft of the main screw 10 is disposed in the shaft bearing 13 of the left post 14. The hollow shaft 3 is provided with a slot 15, along which the spring nut 7 rides as the drum translates. At its right end the hollow shaft 3 is rotatable around the ball bearing 16 located at the right end of the main screw 10. At its right end the hollow shaft 3 is also preloaded by means of the collar bearing friction assembly 17 at the right end of FIG. 2.

The shaft of the main screw 10 at the right end of FIG. 2 is seen to have mounted on its end the bevel gear 18. Bevel gear 18 meshes with the bevel gear 18'. Bevel gear 18' is rotatable on the extension arm 19 of the right post 12. The bevel gear 18' is driven by the motor 20, which is in turn controlled by the switch 21, provided with the switch arm 22, shown in FIG. 1.

The switch 21 also controls the solenoid 23, and thereby controls the shutter 24. The shutter 24 is provided to interrupt the customary light beam 25. The light beam 25 is the recording beam from the seismograph or other instrument and is customarily directed to fall on the sheet of photographic paper 2. In the case of the seismograph, seismic vibrations cause the light beam to deflect cyclically from right to left in FIG. 1 exposing a record 26 on the photographic paper 2. The light beam 25 passes through a window 27 in the casing or wall 28, which serves to protect the photographic paper 2 from the source of the light beam 25 as well as any extraneous light.

In FIG. 2 it will be seen that the center of the drum 1 is provided with a pair of slide bearings 29 and 30 which contain the ball bearings 31, 31 of FIG. 3. The slide bearings 29 and 30 are mounted in the collar 33 of the drum 1. The slide bearings and the ball bearings 31, 31 allow the drum to translate quite easily and smoothly on the hollow shaft.

The drum of FIG. 2 is shown to contain a drive motor 34 and a counterweight 35. Electrical connection to the outside of the drum 1 is made by the pins 36, 36 which project through the plastic gear 4 and contact the commutator rings 37 on the other side of the gear 4.

FIG. 3 shows the paper drive arrangement inside the drum. The photographic paper 2 consists of a long sheet which is wrapped around the outside of the drum 1. The drum itself is split and hinged. The hinge is numbered 38. The drum door, through which the inside of the drum may be reached is numbered 39. A portion of the drum door 39 in the open position is shown in dotted lines as 39'. The extremity of the travel of the drum door is limited by the stop 40 mounted on the wall of the drum 1. The drum 1 and the drum door 39 are both provided with plastic edges 41 and 42 respectively. The paper rides over the plastic edges 41 and 42 smoothly and without tearing, and passes around the paper guide 43. The paper is wrapped upon two rollers within the drum. The paper supply roller is 44 and the paper take-up roller is numbered 45. The counterweight 35 is provided to balance the masses of the motor 34 and the paper on the rollers 44 and 45.

The paper supply roller 44 rotates freely in a bearing and paper take-up roller 45 is driven by a chain drive. Three sprockets are shown in dotted lines in FIG. 3. The sprocket on the take-up roller 45 is numbered 46. The sprocket on the drive motor 34 is numbered 48 and the idler sprocket on the paper supply roller is numbered 47. Disposed around the sprockets 46, 47, and 48 is the sprocket chain 49. Mounted also on the wall of the drum 1 is the motor relay 50.

Inside the drum is also the microswitch assembly shown in dotted lines in FIG. 2, and shown in detail in FIG. 4. The microswitch 51 is mounted on the bracket 52. Bracket 52 also carries the rubber contact wheel 53, which in turn rests against the paper supply roller 44. The contact wheel 53 is rotatable with respect to the bracket 52 and has mounted in common on its shaft the pinion gear 54. Meshed with the pinion gear 54 is the gear 55 which is rotatably mounted on the bracket 52 also. The gear 55 carries the actuating pin 56, which cooperates with the actuated arm 57 of the microswitch. The entire assembly of the microswitch and the bracket is mounted on the hinge pin 58 of the bracket base 59, which is integral with the inside wall of the drum 1. As the paper supply on the paper supply roller 44 decreases, the diameter of the paper supply decreases and the microswitch assembly on the bracket 52, together with the contact wheel 53 is constantly urged into contact with the paper supply by means of the spring 60.

Two further electrical switches are provided. The first is the pushbutton switch 61 mounted on the side of the drum. This switch is simply an override of switch 21 which enables the operator to return the drum and advance the paper from any drum position. This switch is so connected as to prevent translation of the drum past the point of actuation of switch 62, which would damage the translation mechanism. This is merely a convenience useful in starting up when it is desired to tighten the paper 2 between the rollers 44 and 45, and again it is sometimes used to drive the photographic paper 2 forward when some of it has been accidentally exposed or for other similar situations.

The last switch is the microswitch 62 shown at the left top of FIG. 1. This switch breaks the circuit for the holding coil 64, and also connects the commutator current to the commutator rings 37, thereby starting the drive motor 34.

In operation the paper 2 has been placed on the rollers 44 and 45 and has been passed around the drum 1, so that it is in the position depicted in the position of the figures. The motor 6 begins running, and the light beam 25 falls continuously on the paper 2, tracing thereon the record 26. Through gears 5 and 4 the hollow shaft is continuously rotated on bearing 16. Since the spring nut 7 is in threaded contact with the main screw 10, the spring nut follows the spiral of the thread on the main screw 10. Thus the entire drum 1 and the shaft 3 slowly rotate while at the same time the drum 1 translates to the right of FIG. 1. I have chosen the dimensions and the gearing such that a period of twenty-four hours passes until the edge of the drum 1 actuates the switch arm 22 of the microswitch 21. All the while this is happening the light beam 25 traces a spiral on the photographic paper 2, which of course is not visible until the paper is developed in the customary manner.

When the drum 1 actuates the switch arm 22 of the microswitch, two events transpire. First the solenoid 23 is actuated, pulling the shutter 24 into juxtaposition between the light beam 25 and the photographic paper 2. Second the drive motor 20 is actuated. Motor 20 in turn rapidly turns the bevel gear 18' and its cooperative bevel gear 18 to turn the screw 10 relatively quickly. Turning the main screw quickly serves to reverse the previous translating motion. I have chosen the dimensions of the gearing and the speed of the motor 20 such that the reverse translation of the chart drum 1 takes place in less than half a minute. The spring nut 7 again rides the threads of the main screw 10 and the drum 1 returns to its original position, as shown in FIG. 1.

At the left extremity of its travel the drum 1 actuates the microswitch 62. I prefer to have a holding relay in the circuit to the motor 20, said holding relay 63 being actuated by the microswitch 21. This holding relay is disconnected by the switch 62, and consequently the motor 20 stops rotating and the leftward motion of the drum 1 ceases.

At the same time the current to the solenoid 23 is broken and the shutter returns by gravity action to its original position, allowing the light beam 25 to impinge again on the paper 2. The purpose of interrupting the light beam 25 during the return travel of the drum 1, is to prevent a line being drawn on the chart paper 2 during this return travel.

At the same time the movement of the drum 1 to its left extremity causes the pins 36, 36 to contact the commutator rings 37. By action of the switch 62 causing relay 63 to drop out, current is directed through the commutator rings 37, through the pins 36 to the relay contacts 77, 79 controlling the motor 34.

The motor 34 then runs until the actuating pin 56, turning on the gear 55, closes microswitch 51 through actuating arm 57. This action closes switch 51 connecting the current to the relay 50 through contacts 81 allowing motor 34 to now run through contacts 82. Relay 50 is locked in by contacts 77, 78.

Motor 34 continues to run until, upon one full revolution, pin 56, through arm 57 again opens switch 51 (contacts 81, 82), turning off motor 34. Relay 50 is still locked in until switch 62 is released by translation of the drum to the right, closing contacts 62, to the left in FIG. 5.

However, the running of the motor 34 has driven the chain 49 around the sprockets 46, 47, and 48, in turn rotating the paper rollers 44 and 45. The effect of this is to cause an unexposed section of the paper 2 to pass from the paper supply roller 44 out around the drum 1 and to replace the previously exposed section. This previously exposed section is passed back into the rolled up position on the paper take-up roller 45. The size of the sprockets and the rate of the motor 34 have been chosen so that only ten or fifteen seconds suffices for this action.

Thus the drum has been returned to its original position at the left end of the travel and the paper disposed around the outside of the drum has been replaced with new paper in a total of less than one minute.

The drum recorder is now restored to its original condition and is ready to be run for another twenty-four hour period, during which it will repeat the previous cycle. The photographic paper supply is chosen such that a whole month's or two months' supply can be stored in the drum. Consequently the cycle may be repeated automatically, by means of the battery energy or that of any other suitable power supply, until it is time to change the supply of paper for another month or two.

It will be noted that the drum may be moved manually simply by raising the spring nut 7 out of threaded engagement with the main screw 10. This is accomplished by pulling the handle 8 upward against the pressure of the spring 9. Now the entire drum assembly may be slid leftward or rightward with respect to the main screw 10. Release of the handle 8 reengages the spring nut 7 with the threads of the main screw 10.

In FIG. 5 I show the electrical circuit of my chart recorder. Number 62 is the switch for the holding relay 63, having a coil wind 64, and the pole contacts 65, 66, 67 and 68, 69, 70. The return motor contacts are numbered 71, 72. The shutter actuating solenoid contacts are numbered 73, 74. The drum motor contacts are numbered 75, 76.

When the switch 21 is closed by the translation movement of the drum 1, the winding 64 is energized bringing contact 65 closed to contact 66, thereby holding relay 63 is closed. Simutaneously contact 68 is brought into contact with 69, energizing the return motor circuit 71, 72, starting motor 20, and also operating the shutter solenoid 23 which is wired in parallel with motor 20, through the contacts 73, 74.

When return motor 20 has translated drum 1 to the left of FIG. 1, it opens the normally closed contacts of switch 62, thereby dropping out the holding coil 64 in the relay 63. This thereby causes contact 68 to close with contact 70, which in turn sends current to the contacts 75, 76 which send current to the commutator rings 37, 37 and thence through the pins 36, 36 to the motor 34.

In FIG. 5, 61 is the pushbutton for re-cycling. Numbers 77, 78, and 79 in FIG. 6 are the contacts on the holding relay 50, which is provided with the coil 80. The normally open microswitch 51 is provided with contacts 81 and 82 of FIG. 6.

Operation of the circuits of FIGS. 5 and 6 have been previously described in the discussion of the re-cycling operation.

It will be obvious that many changes, variations and modifications may be made in the invention without departing from the spirit thereof. It is not my intention that the scope of my invention be limited other than by the qualifications of the appended claims.

What I claim is:
1. In a recorder for a seismograph,
a pair of posts disposed at opposite ends of the recorder,
a hollow shaft disposed between said posts and rotatable with respect to said posts, and provided with a slot along the longitudinal axis of said hollow shaft,
a main screw disposed within said hollow shaft along the longitudinal axis of said shaft,
a cylindrical hollow drum disposed on said hollow shaft and rotatable with and translatable on said shaft,
a motor on the post at one end of said shaft to drive said drum in one direction slowly with respect to said shaft by rotating said drum on said screw,
a motor on the other post at the opposite end of said shaft to drive said drum in a reverse direction relatively quickly with respect to said shaft by rotating said screw with respect to said shaft,
a paper supply roller and a paper take-up roller mounted inside said drum, a roll of paper on said paper supply roller, passing from the inside of said drum to the outside, a section of said paper wrapped around the drum once and passing back into said drum, and wrapped around said paper take-up roller,
a motor inside said drum to drive said paper rollers aforesaid, to drive the section of the paper from said paper supply roller to replace the section of paper on the outside of the drum, and drive the section of paper on the outside of the drum to the paper take-up roller when the drum is at the position at one end of said shaft, and
a paper metering assembly to control the length of paper driven to and from the outside of the drum by said motor inside the drum.

2. In a recorder for a seismograph,
a pair of posts disposed at opposite ends of the recorder,
a hollow shaft disposed on and between said posts and rotatable with respect to said posts, and provided with a slot along the longitudinal axis of said hollow shaft,
a main screw disposed within said hollow shaft along the longitudinal axis of said shaft,
a cylindrical hollow drum disposed on said hollow shaft and rotatable with said shaft,
a spring nut mounted integral with said drum and disposed in said slot in the hollow shaft, and in threaded engagement with said main screw,
a pair of ball-supported slide bearings between said hollow drum and said hollow shaft upon which said drum slides with respect to said shaft,
a motor on the post at one end of said shaft to drive said drum in one direction with respect to said shaft by rotating said drum on said screw slowly,
a motor on the other post at the opposite end of said shaft to drive said drum in the reverse direction relatively quickly with respect to said shaft by rotating said screw with respect to said shaft,
a paper supply roller and a paper take-up roller mounted inside said drum, a roll of paper on said paper supply roller, passing from the inside of said drum to the outside, a section of said paper wrapped around the drum once and passing back into said drum, and wrapped around said paper take-up roller,
a paper drive roller motor inside said drum to drive said paper rollers aforesaid, to drive the section of paper from said paper supply roller to replace the section of paper on the outside of the drum, and drive the section of paper on the outside of the drum to the paper take-up roller when the drum is at the position at one end of said shaft, and
a paper metering assembly to control the length of paper driven to and from the outside of the drum by said motor inside the drum.

3. In a recorder for a seismograph,
a pair of posts disposed at opposite ends of the recorder,
a hollow shaft disposed on and between said posts and rotatable with respect to said posts, and provided with a slot along the longitudinal axis of said hollow shaft,
a main screw disposed within said hollow shaft along the longitudinal axis of said shaft,
a cylindrical hollow drum disposed on said hollow shaft and rotatable with said shaft,
a preloaded friction assembly on one of said ports to stabilize the rotational movement of the drum with respect to the pair of posts,
a spring nut mounted integral with said drum and disposed in said slot in the hollow shaft, and in threaded engagement with said main screw,
a pair of ball-support slide bearings between said hollow drum and said hollow shaft upon which said drum slides with respect to said shaft,
a motor on one post to drive said drum in one direction between said posts during a period of twenty-four hours, by rotating said drum with said hollow shaft,
a motor associated with said main screw to drive said drum in the opposite direction between said posts during a period of one minute, by rotationg said main screw with respect to said drum and hollow shaft,
a paper supply roller and a paper take-up roller mounted rotatably inside said drum, a roll of paper on said paper supply roller, and passing from the inside of said drum to the outside, a section of said paper wrapped around the drum once and passing back into said drum, and wrapped around said paper take-up roller, a paper drive motor mounted inside said drum to drive the rollers aforesaid, driving the section of paper from said paper supply roller to replace the section of paper on the outside of the drum, and drive the section of paper on the outside of the drum to the paper take-up roller when the drum is at a position at one end of said shaft, and a paper metering assembly to control the length of paper driven to and from the outside of the drum by said motor inside the drum.

References Cited in the file of this patent

UNITED STATES PATENTS

| | | |
|---|---|---|
| 2,726,919 | Hathaway et al. | Dec. 13, 1955 |
| 2,789,776 | Begun et al. | Apr. 23, 1957 |